United States Patent
Saiz

[11] Patent Number: 6,045,088
[45] Date of Patent: Apr. 4, 2000

[54] AIRCRAFT AIR CONDITIONING ENERGY RECOVERY DEVICE

[76] Inventor: Manuel Munoz Saiz, San Emilio 16, 1, 3, Madrid 28017, Spain

[21] Appl. No.: 09/311,770

[22] Filed: May 13, 1999

[30] Foreign Application Priority Data

Dec. 22, 1998 [ES] Spain ........................ 9802665

[51] Int. Cl.[7] ................ B64D 11/00; B64C 3/00; F02C 6/18
[52] U.S. Cl. ............... 244/1 R; 244/118.5; 244/207; 60/39.07
[58] Field of Search ................ 244/207, 118.5; 60/39.07

[56] References Cited

U.S. PATENT DOCUMENTS

| | | | |
|---|---|---|---|
| 2,777,301 | 1/1957 | Kuhn | 244/207 |
| 4,738,416 | 4/1988 | Birbragher | 244/207 |
| 5,482,229 | 1/1996 | Asshauer | 244/118.5 |

*Primary Examiner*—Peter M. Poon
*Assistant Examiner*—Charles R. Ducker, Jr.
*Attorney, Agent, or Firm*—Robert M. Schwartz

[57] ABSTRACT

The aircraft air conditioning energy recovery device exploits the high level energy in relation to the exterior, in the air conditioning air flow required for renewal, and involves the placement of the aircraft outflow valve in a duct through which all the air flows the duct being arranged from the pressurized cabin to the inside of the engine inlet diffuser, through the pylon and in some cases through the wing, with the air-conditioning flow being fed back to the input air flow through multiple openings on the inside wall of the inlet diffuser. The openings or grooves run at a slight angle to the direction of flow to avoid turbulence. The air conditioning input may be introduced through hollow radial guide vanes attached at the front end to the vanes of the first stage of the low-pressure compressor and to the hollow vanes, open at the back, in the first stage or stages of the low-pressure compressor stator where the pressure is lower than that of the cabin air.

6 Claims, 1 Drawing Sheet

AIRCRAFT AIR CONDITIONING ENERGY RECOVERY DEVICE

This application claims the benefit of the earlier filing date of a prior United States patent application filed by the same inventor, Ser. No. 09/138,551 filed Aug. 24, 1998.

CROSS-REFERENCES TO RELATED APPLICATIONS

This application claims the benefit of Spanish Application No. P9800051 filed on Jan. 14, 1998, Spanish Application No. P9801535 filed on Jul. 20, 1998, Spanish Application No. P9802665, filed on Dec. 22, 1998, U.S. Non Provisional Application Ser. No. 09/092,725 filed on Jun. 5, 1998 and U.S. Non Provisional Patent Ser. No. 09/138,551 filed on Aug. 24, 1998.

BACKGROUND OF THE INVENTION

1. Field of the Invention

Aircraft air conditioning exhaust energy recovery.

2. State of the Art

At present, aircraft air conditioning exhaust is expelled through air-flow outlet valves without taking advantage of the pressure or potential energy in relation to the exterior of the aircraft caused by the flow of air required for its renewal, very high in current designs.

BRIEF DESCRIPTION OF THE INVENTION

The aircraft air conditioning energy recovery device exploits the high level energy in relation to the exterior, in the air conditioning air flow required for renewal, and involves the placement of the aircraft outflow valve in a duct through which all the air flows said duct being arranged from the pressurized cabin to the inside of the engine inlet diffuser, through the pylon and in some cases through the wing, with said air-conditioning flow being fed back to the input air flow through multiple openings on the inside wall of the inlet 31 diffuser. Said openings or grooves run at a slight angle to the direction of flow to avoid turbulence.

The air conditioning input may be through hollow radial guide vanes attached at the front end to the vanes of the first phase of the low-pressure compressor and to the hollow vanes, open at the back, in the first stage or stages of the low-pressure compressor stator where the pressure is lower than that of the cabin air. In the latter cases, a check valve will be required to prevent engine air flow from returning to the cabin on the ground or at low altitude.

When the air conditioning at a higher pressure mixes with the low pressure engine input air, it increases its flow, pressure or density and, therefore, its performance.

Advantages: This system takes advantage of the high energy of the air conditioning in relation to the exterior, and does not require moving parts.

MORE DETAIL DESCRIPTION OF THE DRAWINGS

Figure 1:
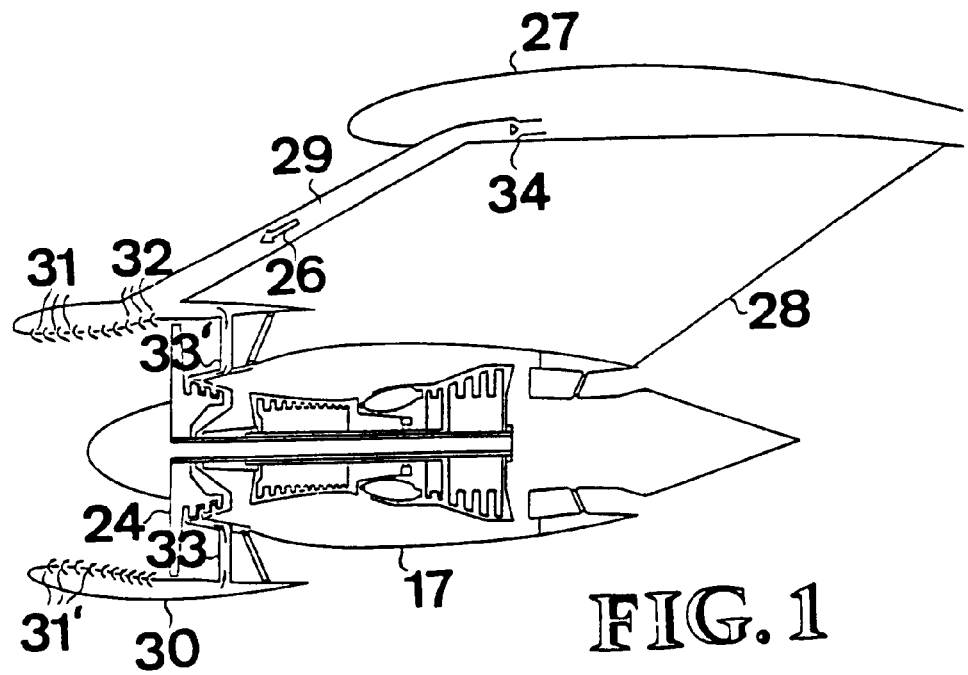
FIG. 1 shows a partial schematic cross-section view of the device of the invention.

FIG. 1 comprises the engine 17, engine fan, 24, with the air-conditioning air feed back, 26, leaving the pressurized cabin through the wing, 27, and pylon, 28, along duct 29 and engine inlet diffuser 30, and discharging through the openings, 31 and 31', inside the inlet diffuser, in the engine air input flow. The arrows, 32, show the movement of the air-conditioning through the openings, 31. The hollow fixed vanes, 33 and 33', carry the air-conditioning through the front of the vanes in the first stage of the low-pressure compressor or to the vanes of the stator in the first stage or stages of the low pressure compressor. The check valve is marked 34. Discharge through inlet diffuser is incompatible with that through the hollow vanes in the front to the vanes of the first stage of the low-pressure compressor or to the hollow vanes open at the back on the stator of the first stage or stages of the low-pressure compressor.

Figure 2:
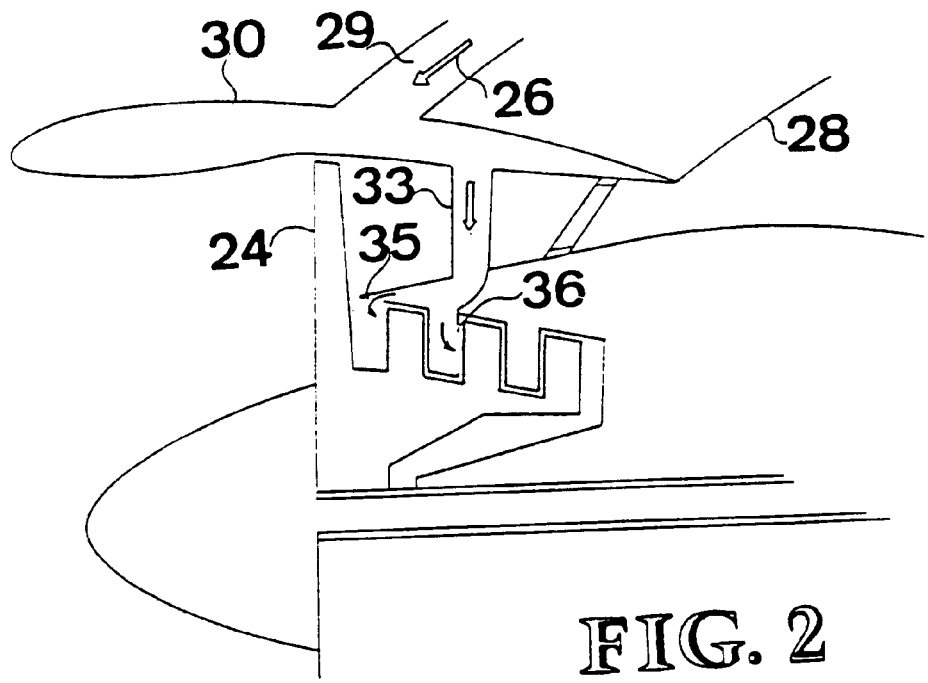
FIG. 2 shows a partial schematic cross-section view of the low pressure compressor.

FIG. 2 comprises the fan 24, pylon, 28, air-conditioning duct, 29, inlet diffuser, 30. The hollow, fixed, vanes 33, carry the air-conditioning to the front of the vanes in the first stage of the low-pressure compressor 35 or to the hollow vanes, opened at the back, in the first stage or stages of the low-pressure compressor stator.

Drawings do not show outflow valves.

What is claimed is:

1. An aircraft air conditioning energy recovery device in an aircraft having a wing, a pressurized air conditioned cabin, a jet engine attached to said wing by a pylon, and said engine having an inlet diffuser, comprising, a duct between said cabin and said engine inlet diffuser for channeling air conditioning waste air from said cabin to said inlet diffuser, and introducing said waste air into an inlet low pressure zone of said engine to increase the energy of airflow prior to entrance into said engine.

2. An aircraft air conditioning energy recovery device according to claim 1, wherein said air conditioning waste air is input into said inside inlet low presure zone of said engine through multiple openings on the inside wall of said inlet diffuser and said openings run at a slight angle to the direction of air flow into said engine inlet diffuser to avoid turbulence.

3. An aircraft air conditioning energy recovery device according to claim 1, wherein said air conditioning waste air is introduced through hollow radial guide vanes of said engine that are attached at their front end to the vanes of the first stage of the low-pressure compressor of said engine.

4. An aircraft air conditioning energy recovery device according to claim 1, wherein said waste air is introduced through hollow vanes, open at their back, in the first stage of the low-pressure compressor stator of said engine.

5. An aircraft air conditioning energy recovery device according to claim 1, wherein a check valve is used to prevent engine air flow from returning to said cabin on the ground and at low altitude.

6. An aircraft air conditioning energy recovery device according to claim 1, wherein said duct is arranged only through said pylon of said engine.

* * * * *